March 23, 1954 S. KRASNOW 2,673,299
SHIELDED BOREHOLE RADIOACTIVITY LOGGING APPARATUS
Filed Sept. 16, 1950

INVENTOR.
SHELLEY KRASNOW
BY
Campbell, Brumbaugh, Free & Graves,
HIS ATTORNEYS.

Patented Mar. 23, 1954

2,673,299

UNITED STATES PATENT OFFICE 2,673,299

SHIELDED BOREHOLE RADIOACTIVITY LOGGING APPARATUS

Shelley Krasnow, Fairfax, Va., assignor to Schlumberger Well Surveying Corporation, Houston, Tex., a corporation of Delaware Application September 16, 1950, Serial No. 185,225

5 Claims. (Cl. 250—83)

1

This application is a division of my copending application Serial No. 391,808, filed May 3, 1941, for "Shielding Methods and Apparatus for Radioactive Borehole Logging."

This invention relates to apparatus and methods for facilitating the measurement of radioactivity within boreholes. In my previous work it had been shown how to lower apparatus into boreholes so as to make measurements of the radioactive properties of the material in situ in the borehole. It had been shown how this might be done by both static and dynamic means.

In the former, measurements are relatively unrelated to the speed of movement of the radioactive measuring element, and in the latter the measurement is directly related to the speed of the movement of the measuring element.

In the measurement of radioactivity, it has been found desirable to limit the response due to nearby sources. At the same time, it is found desirable to accentuate the response due to distant sources. In the usual borehole measurement of radioactivity, an elongated cylindrical instrument is lowered into the borehole. The borehole is usually filled with fluid, which may be water, drilling mud, or mixtures of oil, salt water, and other fluids. These fluids have a radioactivity of their own, since they are contaminated by the radioactive rock material lining the borehole. They will in general have a radioactivity of the same order of strength as that of most of the rock lining the borehole. It is to be remembered that the inverse square law applies here. In other words, a given radioactive source will have an effect approximately inversely proportional to the square of the distance between the source and the measuring instrument. If the borehole fluid has the same activity as the surrounding rock, it will tend to have a considerable effect on the instrument due to its nearness. It is true that the rock being of larger volume will often have a predominating effect. However, the borehole fluid will have a disturbing effect which is preferably substantially reduced.

A consideration of the problem will show that when a measurement is made, the effect obtained will be the sum of that due to the rock lining the borehole, and that due to the borehole fluid. To increase the accuracy of the measurement of activity of rock, it is desirable to reduce the effect due to the borehole fluid.

It is an object of the invention to reduce the effect of the activity of the borehole fluid, and enable a measurement to be made of the activity

2 of the rock lining the borehole. It is a further object of the invention to permit the measurement of activity of sources distant from the measuring instrument, and to reduce the effect due to sources close to the instrument.

In accordance with the present invention, means are employed in conjunction with the apparatus for measurement of radioactive rays or any other rays used for measurement, which means serves to intercept all or a portion of the rays arising from one source and to pass all or most of the rays from another source whereby the former is blanketed and the latter accentuated. Desirably, the segregation or filtration of rays is accomplished based on the distance of the ray generating focus or foci from the measuring instrument, and the segregation or filtration can be utilized to accentuate the rays from a source relatively distant from the measuring apparatus at the expense of rays from a nearer source.

In the example shown, radioactive rays, such as gamma rays, given off by rock material within the borehole are used as an illustrative example. However, any other rays such as those arising from the atomic disintegration of material, or of naturally or artificially induced radioactivity may be utilized without departing from the spirit of the invention. It will be understood that the apparatus disclosed is purely illustrative, and constitutes a specific embodiment of the invention. Various modifications may, however, be made by those skilled in the art without departing from the spirit or intent of the invention.

The invention may be better understood from the following detailed description of a representative embodiment taken in conjunction with the accompanying drawings in which.

Figure 1:
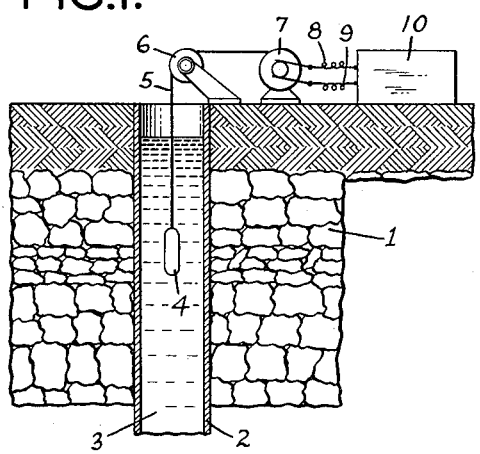
Fig. 1 is a view in longitudinal section of radioactivity well logging apparatus in a borehole.

Referring now to Fig. 1, rock layers typified by 1 are shown traversed by a vertical borehole which may or may not be lined with a metallic casing 2 and may or may not be filled or partially filled with liquid 3. A measuring element 4 is suspended on a cable 5 passing over a sheave 6 which may or may not be utilized to measure the length of cable 5 which has been reeled thereover. The cable is wound upon a drum 7, which has brushes and slip-rings enabling continuous contact to be made at the ends of the cable 5. Conductors 8 and 9, which may be two in number as shown or may be fewer or more than two, are shown leading into measuring, indicating, or recording apparatus indicated schematically as 10.

Figure 2:
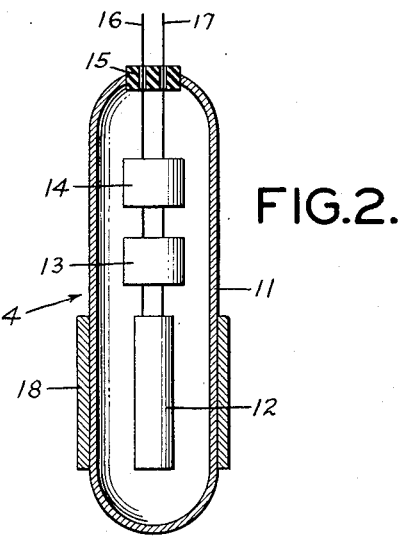
Fig. 2 is a view in longitudinal section of a portion of the logging apparatus shown in Fig. 1.

A vertical schematic view of the elements comprising measuring element 4 is shown in Fig. 2. Here a metallic pressure resistant cartridge 11 is shown enclosing an element sensitive to radiant energy 12. The responses from this sensitive element, are amplified by an apparatus shown schematically as 13, after which the responses are made more suitable for transmission by an element shown schematically as 14.

The sensitive element may be a Geiger-Müller counter, an ionization chamber, a photosensitive element, a photographic film, or any other sensitive element responsive to radiant energy, or atomic disintegration phenomena.

The transmitting element 14 will serve to place the response from the element into a form more suitable for transmission. Thus, it might further amplify the signal given off by amplifier 13. It might also alternately modulate the signal, or cause the integrated or unintegrated release of another signal. The output of element 14 passes into conductors 16 and 17 indicated as going through opening in insulator 15 affixed in a fluid-tight manner to the top of container 11. Conductors 16 and 17 may be combined into a single cable such as represented schematically as 5 in Fig. 1. The details and functions of elements such as 12, 13, 14, and 10 have been adequately taught in my earlier work and need not be enlarged upon here.

Figure 3:
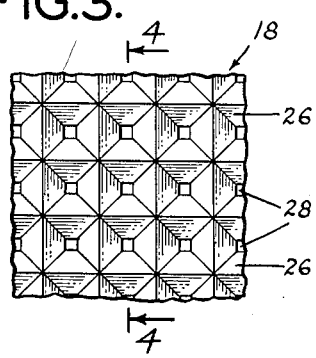
Fig. 3 is a developed view of the inside wall portion of a typical shield adapted for use with the apparatus shown in Figs. 1 and 2 in accordance with the invention.
Figure 4:
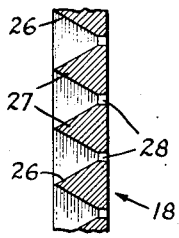
Fig. 4 is a view in longitudinal section taken along line 4—4 of Fig. 3.

Mounted exteriorly on the cartridge 11, so as to form an annular cylindrical member is an element 18 consisting of a screen which serves to discriminate against certain of the rays passing to the element 12. As shown in Figs. 3 and 4, the inner wall of the shield 18 is provided with a plurality of square pyramidal indentations 26, truncated, as shown. On the bottom of each pyramidal indentation is provided an opening 28 which permits free acess to radioactive rays. The portions 26, on the other hand, serve to restrict the entrance of such rays. If desired, the indentations and the openings 28 may be filled with some material different from that of the pyramids themselves so that the interior surface of the shield 18 will present a smooth appearance. The filling material will preferably have different ray absorbing properties relative to radioactive rays than the rest of the shield 18.

Suitable materials for the shield 18 are lead, copper, steel, etc., for example, while aluminum, magnesium, beryllium or other metals may be used as filling materials.

Figure 5:
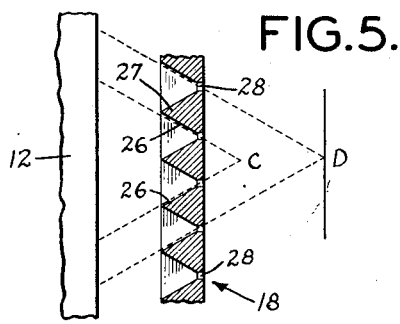
Fig. 5 is a schematic diagram in longitudinal section illustrating typical operating conditions for a shield of the type shown in Figs. 3 and 4.

Fig. 5 shows a typical mode of operation of the apparatus shown in Fig. 1 and described above. The shield 18 is shown in partial vertical cross-section, with projections 27 and openings 28. Two typical sources of radiation are shown, "C" being a nearby source and "D" a distant one. Thus, "C" may be a source within a borehole fluid, while "D" may be a source within a rock lining the borehole. To the extreme left of the diagram is a measuring member such as the element 12 of Fig. 2, for example, which receives the radioactive rays and which desirably has a large area responsive to such rays. The wall of the cartridge 11 has been omitted in this view for simplicity.

It will be noted that the rays emanating from source "C" are admitted in narrow beams through the nearest openings 28. Any other rays emanating from "C" will find their paths obstructed by projections 27, as shown. If one now considers a source such as "D," it is seen that the source can throw a beam of radioactive rays through openings 28, these openings being unavailable to source "C." It is understood that emanations or rays arising from source "D" will also be admitted through the same openings as are available for source "C." These rays have not been shown in the interests of not confusing the drawing. Since the same reasoning applies to the vertical and the lateral dimensions, it is obvious that many times the number of rays will be admitted from source "D" as can be admitted from source "C."

While it is true that the source "D," being farther from the measuring elements 12, will have its effect reduced, this loss will be partly compensated and in certain cases more than compensated, by the fact that rays arising from source "D" will be admitted in many more openings than are available to source "C."

Under certain conditions, shields of the type shown in Figs. 3 and 4 will discriminate against a relatively distant source and in favor of a nearby source. Thus, as between a point source disposed near and in alignment with one of the openings 28 in the shield 18 and another point source also in alignment with the same opening 28 but a greater distance away, the shield 18 will discriminate against the latter source and in favor of the former.

Figure 6:
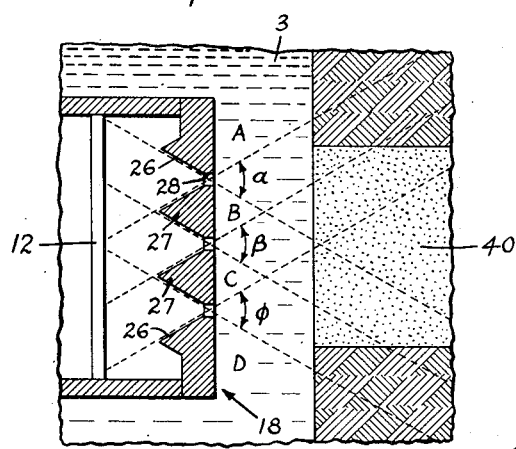
Fig. 6 illustrates schematically different typical operating conditions for a shield of the type shown in Figs. 3 and 4.

In Fig. 6, the detector 12 is completely surrounded by the shield 18 and is disposed in the drilling mud 3 in the borehole adjacent a radioactive formation 40 of finite thickness. As shown, the detector 12 responds to radiation from the mud 3 and the surrounding formations subtended by the angles $\alpha$, $\beta$ and $\Phi$. The shield 18 screens the detector 12 from the mud lying in the zones A, B, C and D, thereby discriminating against radiations from the mud and in favor of the radiations from the formation 40.

All of the above explanations have been made on the assumption that the material utilized in the projecting portions of the various modifications of an element 18 is impervious to the rays being measured. This simplification is justified when the rays have little penetrating power as for instance in the case of soft gamma rays. The same simplifications may be adopted if the material forming the projecting portions of the elements 18 has a very high absorbing power, as will be the case with such a material as lead, utilized with rays of moderate penetrating power. The more highly penetrating the rays relative to the stopping power of the shield, the less effective the shield will be in discriminating between rays from near and distant sources. If a source gives off rays of different wave lengths simultaneously, the shield will have different discriminatory powers depending upon the penetrating power of each wave length of the rays originating from the material. Thus, if the sources "D" and "C" in Fig. 5 give off, for example, very soft and very hard gamma rays, the shielding member 18 would discriminate very effectively as regards the soft gamma rays, reducing those emanating from sources "C" and admitting those arising from source "D." However, the hard gamma rays emanating from source "C" would not be discriminated against so effectively since the material forming the projections 27 would be partially transparent to such rays. There would be a discriminatory effect depending upon distance, but this fact would not be so pronounced as was noted for the soft gamma rays. It is thus seen that the shielding member 18 will have a combined effect, serving to discriminate both as to wave length and as to distance. In cases where the apparatus is to be utilized in borehole radioactive measurements, it will often be found desirable to make the projecting members 27 in Fig. 5 and the corresponding projections in the other modifications of highly absorbing material such as lead, so that there will be a discriminatory effect related to distance even for hard gamma rays.

As is well known in the radiant energy art, materials have scattering powers, which are different for different materials. Thus, a metal when struck by gamma rays will give off radiant energy, in some cases in the form of softer gamma rays, and in some cases in the form of long X-rays or even visible light. Since the shields disclosed herein are utilized in such manner that the rays must pass through them, it is obvious that they will in turn give off other rays.

In selecting the material of the shield, whether the shield be smooth, or whether it be corrugated as shown in the various modifications of shield 18, the material chosen may be such that the desired scattering power or power to emit secondary radiation of a desired sort may be utilized. Thus, brass is well known as having certain secondary ray emitting properties when struck by X-rays or gamma rays. If a brass shield is utilized, the thickened portions of it will give rise to softer rays than originally impinged upon it. If the shield is so constructed that distant rays pass through the thickest portions, then the production of secondary rays will be richest for those rays originating from a distance. If desired, the shield 18 may have another element, such as the material of cartridge 11, interposed between it and the measuring element. If the cartridge is made of thin, but highly absorbing material, it can serve to exclude softer rays. Thus, rays from a distance may be converted into softer rays and excluded by further filtering. The rays not excluded will be of their original hardness and will suffer little diminution.

While the scattering above referred to relates to the production of softer rays excited by hard ones, such as X-rays or gamma rays, it will be realized that scattering relates also to the geometrical distribution of the new rays. Thus, when an original ray strikes the material of a shield such as 18, new rays are given off in a sort of cone with the apex at the point of production of these new rays. In other words, the new ray will not proceed necessarily in the same straight line as the original ray, but will in general proceed at an angle thereto. It is well known that certain crystals have the faculty of giving off secondary rays at known definite angles to the incident rays. If a shielding member such as 18 is made up of such crystal material, it will be known that all rays impinging at a certain angle will give off new rays bearing a known geometrical relation thereto. The projecting members need not be a single solid crystal, but may be molded of a pulverized mass of crystals, and may further be coated with a material to protect this molded mass. As an example of a crystalline material which will serve may be mentioned sodium chloride.

It is thus seen that means are provided for conversion of rays to rays of other wave lengths, the conversion being selective so as to apply chiefly to rays from distant sources. As is obvious, the process may be inverted, and the conversion made greatest for rays from nearby sources by using the alternative type of shield disclosed herein.

From the foregoing, it will be understood that the invention provides a shield for a radioactivity detector for use in a borehole or the like, which is adapted to favor radiation from relatively distant sources such as the surrounding earth formations, for example, and to discriminate against radiation from relatively nearby sources such as a column of liquid in the borehole in which the apparatus is suspended. In this fashion, more accurate indications of the nature of the earth formations may be obtained.

It will be understood that the shield 18 is susceptible of considerable modification in form and detail within the spirit of the invention. For example, it may be made in any of the forms disclosed in the above-mentioned copending application except that the indentations and protuberances will be formed in the inside wall of the shield instead of the outside wall. Other modifications will be readily apparent to those skilled in the art. Therefore, the specific embodiment disclosed is not to be regarded as limiting the scope of the following claims.

I claim:

1. In apparatus for obtaining indications of radioactivity in a borehole, the combination of an element sensitive to radioactivity and adapted to be lowered into a well, and a shielding member disposed so as to shield said element at least partially from radiations originating externally of the sensitive element, said shielding member being made of a solid homogeneous material and having formed in the side thereof facing said sensitive element depressions which converge outwardly from the sensitive element.

2. In apparatus for obtaining indications of radioactivity in a borehole, the combination of an element sensitive to radioactivity and adapted to be lowered into a well, and a shielding member disposed so as to shield said element at least partially from radiations originating externally of the sensitive element, said shielding member being made of a solid homogeneous material and having formed in the side thereof facing said sensitive element depressions which converge outwardly from the sensitive element and terminate in relatively small openings in the outer wall of the shielding member.

3. In apparatus for obtaining indications of radioactivity in a borehole, the combination of an element sensitive to radioactivity and adapted to be lowered into a well, and a shielding member disposed so as to shield said element at least partially from radiations originating externally of the sensitive element, said shielding member being made of a solid homogeneous material and having protuberances of pyramidal shape formed on the side thereof facing the sensitive element.

4. In apparatus for obtaining indications of radioactivity in a borehole, the combination of an element sensitive to radioactivity and adapted to be lowered into a well, and a shielding member disposed so as to shield said element at least partially from radiations originating externally of the sensitive element, said shielding member having outwardly converging pyramidal indentations, truncated, formed in the side of the shielding member facing the sensitive element.

5. In apparatus for obtaining indications of radioactivity in a borehole, the combination of an element sensitive to radioactivity and adapted to be lowered into well, a shielding member disposed so as to shield said element at least partially from radiations originating externally of the sensitive element, said shielding member having outwardly converging pyramidal indentations, truncated, formed in the side of the shielding member facing the sensitive element, and means forming openings in the outer wall of the shielding member communicating with said indentations.

SHELLEY KRASNOW.

References Cited in the file of this patent

UNITED STATES PATENTS

| Number | Name | Date |
|---|---|---|
| 2,195,729 | Kamm | Apr. 2, 1940 |
| 2,253,622 | Iten | Aug. 26, 1941 |
| 2,522,522 | Krasnow | Sept. 19, 1950 |

FOREIGN PATENTS

| Number | Country | Date |
|---|---|---|
| 754,566 | France | Aug. 28, 1933 |